(12) United States Patent
Hoffmann et al.

(10) Patent No.: US 12,016,400 B2
(45) Date of Patent: Jun. 25, 2024

(54) DISPENSING DEVICE WITH AN ELECTROMECHANICAL FEEDBACK SYSTEM AND METHODS OF USE

(71) Applicant: Airo Brands Inc., Staten Island, NY (US)

(72) Inventors: Allen Hoffmann, Westminster, CO (US); Erik Stewart, Palo Alto, CA (US)

(73) Assignee: Airo Brands Inc., Staten Island, NY (US)

( * ) Notice: Subject to any disclaimer, the term of this patent is extended or adjusted under 35 U.S.C. 154(b) by 0 days.

(21) Appl. No.: 18/436,733

(22) Filed: Feb. 8, 2024

(65) Prior Publication Data

US 2024/0172805 A1  May 30, 2024

Related U.S. Application Data

(63) Continuation of application No. PCT/US2023/076967, filed on Oct. 16, 2023.

(60) Provisional application No. 63/379,601, filed on Oct. 14, 2022.

(51) Int. Cl.
| | | |
|---|---|---|
| *A24F 40/53* | (2020.01) | |
| *A24F 40/40* | (2020.01) | |
| *A24F 40/51* | (2020.01) | |
| *A24F 40/60* | (2020.01) | |

(52) U.S. Cl.
CPC .............. *A24F 40/60* (2020.01); *A24F 40/40* (2020.01); *A24F 40/51* (2020.01); *A24F 40/53* (2020.01)

(58) Field of Classification Search
CPC ........... A24F 40/53; A24F 40/51; A24F 40/40
See application file for complete search history.

(56) References Cited

U.S. PATENT DOCUMENTS

| | | | |
|---|---|---|---|
| 9,814,271 B2 | 11/2017 | Goggin et al. | |
| 9,913,497 B2 | 3/2018 | Galloway et al. | |
| 9,933,790 B2 * | 4/2018 | Blackley ............ | G01N 33/0036 |
| 10,231,485 B2 | 3/2019 | Sur | |
| 10,470,499 B2 | 11/2019 | Clemens et al. | |
| 10,568,359 B2 | 2/2020 | Henry, Jr. | |
| 10,687,559 B2 | 6/2020 | Memari et al. | |
| 10,750,788 B2 | 8/2020 | Scatterday | |

(Continued)

FOREIGN PATENT DOCUMENTS

| | | |
|---|---|---|
| EP | 3711552 A1 | 9/2020 |
| WO | 2020234059 | 11/2020 |

(Continued)

OTHER PUBLICATIONS

WIPO/ISA/US, International Search Report and Written Opinion issued on Feb. 6, 2024 in PCT/US2023/076967, 13 pages.

(Continued)

*Primary Examiner* — Hae Moon Hyeon
(74) *Attorney, Agent, or Firm* — J. Peter Paredes; Amin Wasserman Gurnani LLP

(57) ABSTRACT

Provided herein are systems and apparatuses for a dispensing device with an electromechanical feedback system having an atomizer and a motor in an external shell housing. The atomizer that activates when a user inhales or applies negative pressure to external shell housing. A circuit provides feedback to the user about the operational state of the dispensing device.

11 Claims, 4 Drawing Sheets

(56) References Cited

U.S. PATENT DOCUMENTS

| | | |
|---|---|---|
| 11,013,269 B2 | 5/2021 | Alarcon et al. |
| 11,044,943 B2 | 6/2021 | Scatterday |
| 11,229,239 B2 | 1/2022 | Galloway et al. |
| 11,253,006 B2 | 2/2022 | Memari et al. |
| 11,259,569 B2 | 3/2022 | Hejazi |
| 11,406,139 B2 | 8/2022 | Alarcon et al. |
| 2009/0283103 A1 | 11/2009 | Nielsen et al. |
| 2016/0338407 A1 | 11/2016 | Kerdemelidis |
| 2016/0345628 A1 | 12/2016 | Sabet |
| 2016/0363339 A1* | 12/2016 | Blackley ............... A61L 9/14 |
| 2017/0119052 A1 | 5/2017 | Williams et al. |
| 2019/0021400 A1 | 1/2019 | Fornarelli |
| 2019/0090541 A1 | 3/2019 | Bernauer |
| 2019/0223510 A1 | 7/2019 | Bowen et al. |
| 2019/0247606 A1 | 8/2019 | Williams |
| 2019/0269175 A1 | 9/2019 | Bache et al. |
| 2019/0364969 A1 | 12/2019 | Fu et al. |
| 2020/0000143 A1 | 1/2020 | Anderson et al. |
| 2020/0113242 A1 | 4/2020 | Novak, III et al. |
| 2020/0120986 A1 | 4/2020 | Sur et al. |
| 2021/0046261 A1 | 2/2021 | Barbaric et al. |
| 2021/0154420 A1 | 5/2021 | Jorgensen et al. |
| 2021/0259316 A1 | 8/2021 | Kersey et al. |
| 2021/0282465 A1 | 9/2021 | Cristian |
| 2021/0321669 A1 | 10/2021 | Scatterday |
| 2021/0401061 A1 | 12/2021 | Davis et al. |
| 2022/0039467 A1 | 2/2022 | Scatterday |
| 2022/0071284 A1 | 3/2022 | Selby et al. |
| 2022/0095692 A1* | 3/2022 | Ferrie ............... A24F 40/57 |
| 2022/0104552 A1 | 4/2022 | Galloway et al. |
| 2022/0110372 A1 | 4/2022 | Bessant et al. |
| 2022/0142260 A1 | 5/2022 | Wells |
| 2022/0142261 A1 | 5/2022 | Wells |
| 2022/0160046 A1 | 5/2022 | Wells |
| 2022/0175049 A1 | 6/2022 | Memari et al. |
| 2022/0175050 A1 | 6/2022 | Harden et al. |
| 2022/0183354 A1 | 6/2022 | Sayed et al. |
| 2022/0202102 A1 | 6/2022 | Desnerck et al. |
| 2022/0218925 A1 | 7/2022 | McLaughlin |
| 2022/0249941 A1 | 8/2022 | Bowen et al. |
| 2022/0256932 A1 | 8/2022 | Yoon et al. |
| 2022/0256934 A1 | 8/2022 | Harden et al. |
| 2022/0304378 A1 | 9/2022 | Aller et al. |

FOREIGN PATENT DOCUMENTS

| | | |
|---|---|---|
| WO | 2021026661 | 2/2021 |
| WO | 2021165643 | 8/2021 |
| WO | 2021240131 | 12/2021 |
| WO | 2021259948 | 12/2021 |
| WO | 2022058728 | 3/2022 |
| WO | 2022103757 | 5/2022 |

OTHER PUBLICATIONS

Pourchez, J. et al. "Impact of power level and refill liquid composition on the aerosol output and particle size distribution generated by a new-generation e-cigarette device", Aerosol Science and Technology, 52:4, 359-369 (2018).

* cited by examiner

DISPENSING DEVICE WITH AN ELECTROMECHANICAL FEEDBACK SYSTEM AND METHODS OF USE

CROSS-REFERENCE TO RELATED APPLICATIONS

The present application claims priority to PCT application serial no. PCT/US2023/076967, filed Oct. 16, 2023, which claims priority to U.S. provisional application Ser. No. 63/379,601, filed Oct. 14, 2022, each herein incorporated by reference in their entirety.

BACKGROUND

The present invention relates to dispensing devices and their means of communication with the user and more specifically, it refers to an electromechanical feedback system and its modes of operation.

Existing electronic cigarette and vaporizer systems rely on digital control mechanisms in order to modulate user experience feedback. These digital systems utilize software driven signaling to communicate between components and to signal the user. Unfortunately, aberrant or unexpected activation is the primary failure mode that can be introduced by microcontroller to haptic driver to feedback systems. Due to failure of the encoded software within the driver or within the device it controls, or within the microcontroller and the data inputs it monitors and the outputs it generates. It would be desirable to produce an electromechanical feedback system that simplifies the control, reduces the cost of construction, and eliminates several points of failure. The present invention attempts to solve these problems, as well as others.

SUMMARY OF THE INVENTION

Provided herein are systems and apparatuses for a dispensing device with an electromechanical feedback system.

The systems and apparatuses are set forth in part in the description which follows, and in part will be obvious from the description, or can be learned by practice of the methods, apparatuses, and systems. The advantages of the systems and apparatuses will be realized and attained by means of the elements and combinations particularly pointed out in the appended claims. It is to be understood that both the foregoing general description and the following detailed description are exemplary and explanatory only and are not restrictive of the systems and apparatuses, as claimed.

Accordingly, it is an object of the invention not to encompass within the invention any previously known product, process of making the product, or method of using the product such that Applicants reserve the right and hereby disclose a disclaimer of any previously known product, process, or method. All rights to explicitly disclaim any embodiments that are the subject of any granted patent(s) of applicant in the lineage of this application or in any other lineage or in any prior filed application of any third party is explicitly reserved. Nothing herein is to be construed as a promise.

BRIEF DESCRIPTION OF THE DRAWINGS

In the accompanying figures, like elements are identified by like reference numerals among the several preferred embodiments of the present invention.

DETAILED DESCRIPTION OF THE INVENTION

Figure 1:
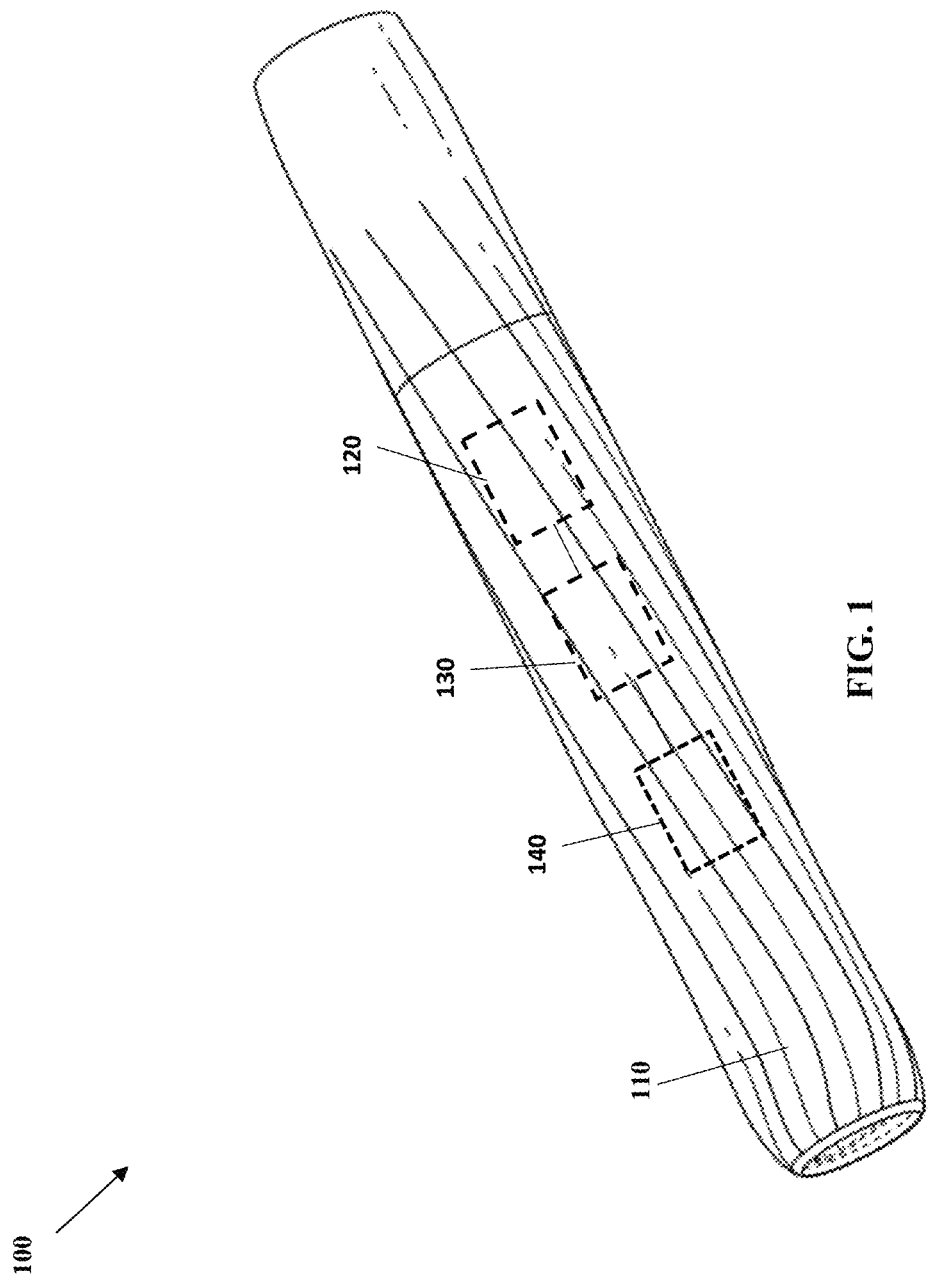
FIG. 1 is a front view of the dispensing device including the electromechanical feedback, the battery, and the switch, according to one embodiment.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

The use of the terms "a" and "an" and "the" and similar referents in the context of describing the invention are to be construed to cover both the singular and the plural, unless otherwise indicated herein or clearly contradicted by context. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g." or "such as") provided herein, is intended merely to better illuminate the invention and does not pose a limitation on the scope of the invention unless otherwise claimed. No language in the specification should be construed as indicating any nonclaimed element as essential to the practice of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, biochemical, electrical, and mechanical arts. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

DESCRIPTION OF THE EMBODIMENTS

A dispensing device with an electromechanical feedback system disclosed herein differs significantly from those utilizing haptic technology. Haptic technology includes a haptic drive and a haptic motor. A haptic driver is a ROM or programmable chip that receives digital signals from the microcontroller and sends digital signals to a haptic motor which is configured to receive and process those digital signals. In some embodiments, the haptic driver can monitor the status of the motor and inform the microcontroller. A Haptic Motor is a motor capable of receiving digital signaling information from Haptic Drivers and integrated Microcontrollers. It is programmed to accept the digital signaling as an input which corresponds to a specific wavelength or frequency of vibration to be produced. It responds to the haptic driver with digital signaling indicating its vibrational state resulting in continuous monitoring by the system.

A microcontroller is a small computer on a single VLSI integrated circuit (IC) chip. A microcontroller contains one or more CPUs (processor cores) along with memory and programmable input/output peripherals. Program memory in the form of ferroelectric RAM, NOR flash or OTP ROM is also often included on chip, as well as a small amount of RAM. Microcontrollers are designed for embedded applications, in contrast to the microprocessors used in personal computers or other general-purpose applications consisting of various discrete chips. The microcontroller is in electrical connection with multiple components within an electronic vaporizer device. The microcontroller may be connected to drivers which are then connected to downstream devices such as a haptic drive.

In contrast, the present invention comprises an electromechanical feedback system that eliminates the microcontroller and the haptic driver for a direct current motor system. The dispensing device with an electromechanical feedback system includes at least one switch that monitors conditions and when those conditions are met, the switch opens a power gateway to downstream components in the feedback system. In some embodiments, a direct current (DC) Motor can be activated solely by administration of current which is provided when the switch is in the active position. There are several issues with existing haptic motor systems including but not limited to increased cost for componentry and being subject to software driven code errors resulting in failure to operate or mis-activation.

As shown in FIG. 1, the Dispensing Device 100 comprises an external shell housing 110 and electrically connected componentry and circuits including an atomizer that activates when a user sucks or applies negative pressure to external shell housing 110. Within the external shell, an Electromechanical Feedback Device 120 is operably connected to a battery 130 through a switch 140. The switch 140 accepts an input and in response to the input opens a power gateway allowing power to flow from the battery to the Electromechanical Feedback Device 120. The system is flexible, where the type of switch and the type of downstream components can both vary which can result in different modes of operation. The Electromechanical Feedback Device 120 includes the type of switch and downstream components that provide feedback to the user about the operational state of the device, including operation of the atomizer to vaporize a liquid or gel into a smoke or gas form. The Electromechanical Feedback Device includes circuitry to operably connect the switch 140, the battery, and the atomizer operably when a user applies force or suction to the external housing 110.

In one embodiment, the Electromechanical Feedback Device 120 may comprise a DC motor. The Electromechanical Feedback Device may also be an Armature Controlled DC motor, according to another embodiment. The Electromechanical Feedback Device may also be an light-emitting diode (LED) light, according to another embodiment. The Electromechanical Feedback Device may also be a piezoelectric motor, according to another embodiment. The Electromechanical Feedback Device may also be a magnetic vibration motor or other type of DC motor, according to another embodiment.

A DC Motor is any of a class of rotary electrical motors that converts DC electrical energy into mechanical energy. The most common types rely on the forces produced by magnetic fields. Nearly all types of DC motors have some internal mechanism, either electromechanical or electronic, to periodically change the direction of current in part of the motor. A coil of wire with a current running through it generates an electromagnetic field aligned with the center of the coil. The direction and magnitude of the magnetic field produced by the coil can be changed with the direction and magnitude of the current flowing through it.

An LED is a semiconductor light source that emits light when current flows through it. Electrons in the semiconductor recombine with electron holes, releasing energy in the form of photons (Energy packets). The color of the light (corresponding to the energy of the photons) is determined by the energy required for electrons to cross the band gap of the semiconductor. White light is obtained by using multiple semiconductors or a layer of light-emitting phosphor on the semiconductor device. Current through the LED must be regulated by an external circuit such as a constant current source to prevent damage. Since most common power supplies are (nearly) constant-voltage sources, LED fixtures must include a power converter, or at least a current-limiting resistor. In some applications, the internal resistance of small batteries is sufficient to keep current within the LED rating.

A piezoelectric motor or piezo motor is a type of electric motor based on the change in shape of a piezoelectric material when an electric field is applied, as a consequence of the converse piezoelectric effect. An electrical circuit makes acoustic or ultrasonic vibrations in the piezoelectric material, most often lead zirconate titanate and occasionally lithium niobate or other single-crystal materials, which can produce linear or rotary motion depending on their mechanism. Examples of types piezoelectric motors include inchworm motors, stepper and slip-stick motors as well as ultrasonic motors which can further be further categorized into standing wave and travelling wave motors. Piezoelectric motors typically use a cyclic stepping motion, which allows the oscillation of the crystals to produce an arbitrarily large motion, as opposed to most other piezoelectric actuators where the range of motion is limited by the static strain that may be induced in the piezoelectric element.

In other embodiments, other electric motors may be used depending on the power source type, construction, application and type of motion output. Electric motors can be powered by AC or DC, be brushed or brushless, single-phase, two-phase, or three-phase, axial or radial flux, and may be air-cooled or liquid-cooled. Electric motors operate on one of three physical principles: magnetism, electrostatics and piezoelectricity.

According to one embodiment, the Switch 140 is an ASIC. An ASIC is an application-specific integrated circuit (ASIC) and an integrated circuit (IC) chip customized for a particular use, rather than intended for general-purpose use. Application-specific standard product (ASSP) chips are intermediate between ASICs and industry standard integrated circuits like the 7400 series or the 4000 series. ASIC chips are fabricated using metal-oxide-semiconductor (MOS) technology, as MOS integrated circuit chips.

According to one embodiment, the Switch is an ASIC connected to a transducer. In some embodiments, the Switch is a ROM chip. In other embodiments, the Switch is a ROM chip connected to a transducer. In other embodiments, the Switch is a puff sensor. In other embodiments, the Switch is a puff sensor connected to a transducer.

There are a number of different types of circuits capable of determining when a power circuit should be opened and closed. This results in a plurality of inputs with a single output—the activation of the power gateway. Simultaneously, the components connected to the power gateway can vary which results in a plurality of outputs including but not limited to vibration, sound emission, light emission, electrostatics, and other feedback mechanisms that provide operational status of the atomizer or the battery.

In one embodiment, the battery may have a cell capacity between about 200 mAh and about 500 mAh, alternatively, between about 250 mAh and about 450 mAh, alternatively, between about 300 mAh and about 400 mAh. The battery cell capacity may be adjusted to provide sufficient power to the electromechanical device selected for operation. The battery cell capacity may be charged through an AC or DC current or through a USB or USB-C power cable.

In one embodiment, the atomizer includes a well or reservoir to hold an e-liquid, a heating surface to vaporize the e-liquid, and a wick to transport the e-liquid from the reservoir to the heating surface. The atomizer may be a direct-to-lung vape tank (DTL Tank), a Mouth-to-Lung Tank (MTL Tank), or a Vape Pod. A mouth-to-lung vape tank is a tank-style atomizer that's designed to support the mouth-to-lung inhaling style and will work with most threaded vape tanks and vape mods. A direct-to-lung vape tank is a tank-style vape atomizer that's designed with very large airflow vents and a wide mouthpiece to facilitate deep inhalation directly into the lungs. A pod vaping system is a vaping device with a self-contained removable pod that functions both as the atomizer and as the e-liquid storage.

Figure 2A:
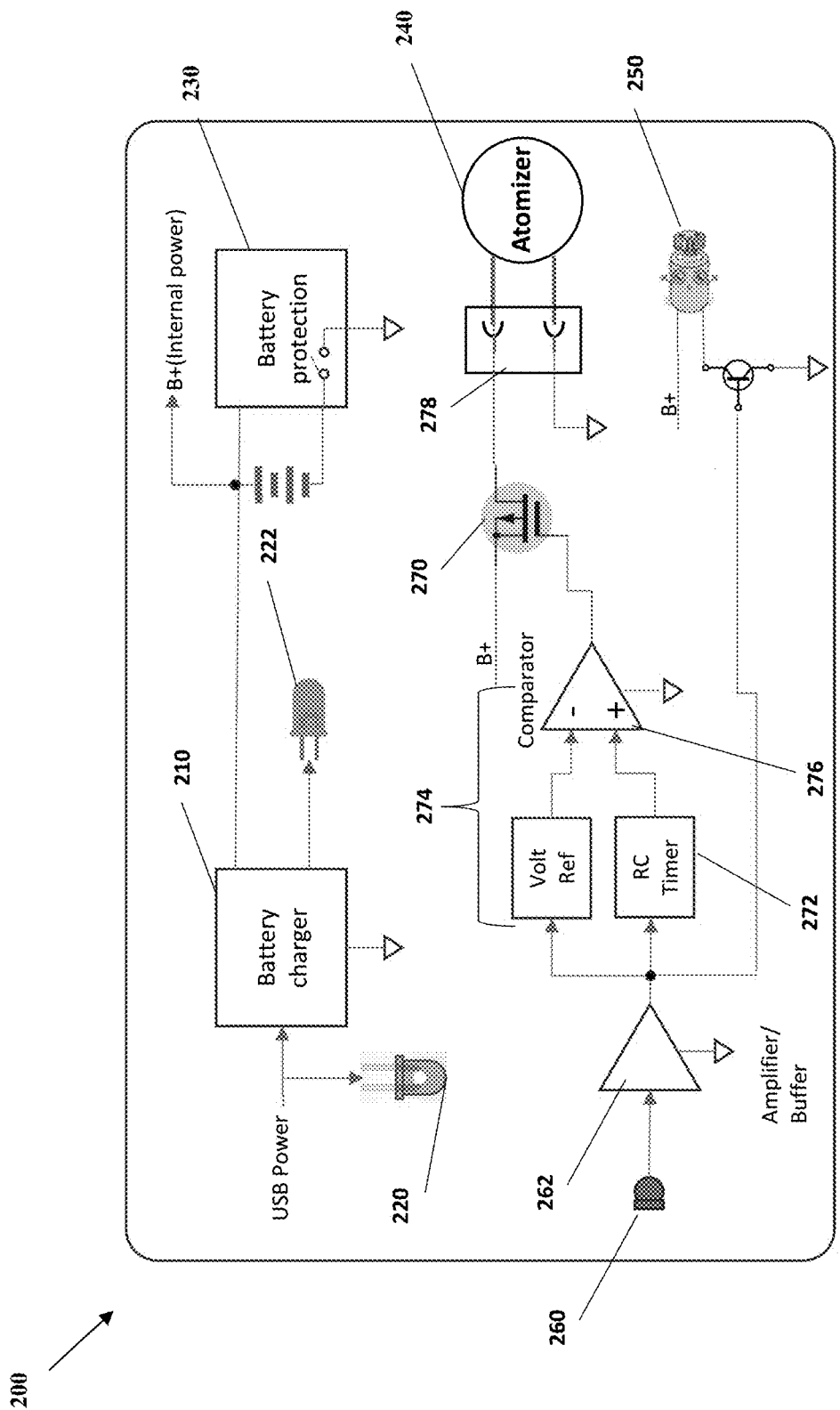
FIG. 2A is a schematic of the dispensing device including the electromechanical feedback circuit, according to one embodiment.

According to another embodiment shown in FIG. 2A, the Electromechanical Feedback Device circuit 200 includes a battery charger 210 operably coupled to the first LED light 220, a second LED light 222, and a battery protection chip 230. The first LED light turns on when the USB power source is plugged in. The second LED light turns on when the battery charging is finished.

The Electromechanical Feedback Device circuit 200 includes an atomizer 240 and motor 250 are operably controlled by the signal of an air-flow sensor 260. The direct current motor 250 is directly driven by the Amplifier/Buffer 262. The atomizer 240 is powered through a MOSFET 270 operably coupled to a first switch 278. The MOSFET 270 is operably coupled to an RC timer 272 and a logical circuit 274. The RC timer 272 includes a 10 second puff limit, according to one embodiment. The logic circuit 274 includes a comparator 276. The Electromechanical Feedback Device circuit 200 includes an air-flow detection comprising an air-flow sensor 260 that has logical output and connected to a amplifier/buffer 262. Battery protection chip 230 protect features including overcharging, over-discharging, overcurrent, and short circuit, etc. The new design has the same safety level of the received samples, since the charger and protector remain same.

MOSFET stands for metal-oxide-semiconductor field-effect transistor. MOSFET is a type of field-effect transistor (FET), most commonly fabricated by the controlled oxidation of silicon. It has an insulated gate, the voltage of which determines the conductivity of the device. This ability to change conductivity with the amount of applied voltage can be used for amplifying or switching electronic signals. A metal-insulator-semiconductor field-effect transistor (MISFET) is a term almost synonymous with MOSFET. Another synonym for MOSFET is IGFET for insulated-gate field-effect transistor. The MOFSET may be 20 V, single P-channel Trench MOSFET.

The battery protection chip 230 may be a one cell lithium-ion/polymer battery protection integrated circuit. The battery protection chip contains advanced power MOSFET, high-accuracy voltage detection circuits and delay circuits. The battery protection chip includes protection functions required in the battery application including overcharging, over-discharging, overcurrent and load short circuiting protection etc. The accurate overcharging detection voltage ensures safe and full utilization charging. The low standby current drains little current from the cell while in storage.

The battery charger is a linear charge management controller for use in charging from a USB port and adheres to all the specifications governing the USB power bus. The battery charger employs a constant-current/constant-voltage charge algorithm with selectable preconditioning and charge termination. The constant voltage regulation is fixed with four available options: ~4.20V, ~4.35V, ~4.40V or ~4.50V, to accommodate emerging battery charging requirements. The constant current value is set with one external resistor. The battery charger limits the charge current based on die temperature during high power or high ambient conditions. This thermal regulation optimizes the charge cycle time while maintaining device reliability.

The amplifier/buffer is an operational amplifier (op amp) with rail-to-rail output swing capabilities. This op amp provides for space-constrained applications where low-voltage operation and high capacitive-load drive are required. The capacitive-load drive is about 500 pF, and the resistive open loop output impedance makes stabilization easier with much higher capacitive loads. This op amp is designed specifically for low-voltage operation. The op amp feature unity gain stability, an integrated RFI and EMI rejection filter, and no-phase reversal in overdrive conditions.

The air flow sensor is a three-pin microphone, pneumatic switch, working voltage about 2.5v to about 4.2v, output high level, small static current and stable performance.

Figure 2B:
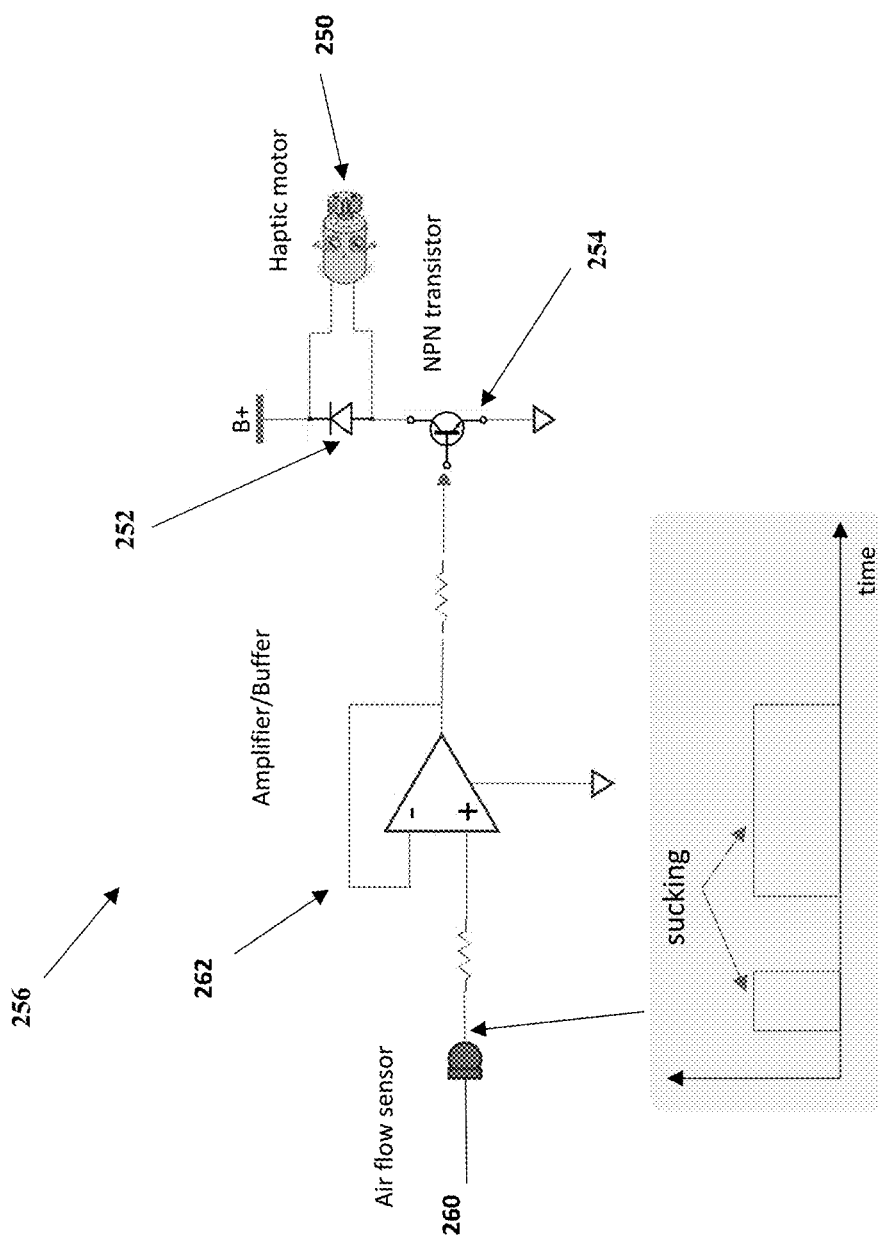
FIG. 2B is a schematic of the haptic feedback circuit, according to one embodiment.

According to another embodiment in FIG. 2B, the schematic of the direct current motor circuit 256 including a diode 252 operably coupled to an NPN transistor 254 and an amplifier/buffer 262. The amplifier/buffer 262 is set as a buffer, where the operational amplifier includes an output that is same as the input with higher driving capability. The diode 252 is used for circuit protection. In one embodiment, the direct current motor 250 is a DC motor. When the NPN transistor 254 is turned on, the voltage applies on the motor and the motor starts to work. The NPN transistor 254 works as a switch that provides around 0.3V Vce (sat) voltage drop to protect motor by working under the rated voltage. The Air flow sensor 260 includes an output digital (logical) signal: Output HIGH level when sucking, an Output LOW level when not sucking, and a sucking strength is not configurable.

The NPN transistor is a type of bipolar transistor with three layers that are used for signal amplification. It is a device that is controlled by the current. A negative-positive-negative transistor is denoted by the abbreviation NPN. A p-type semiconductor is fused between two n-type semiconductor materials in this configuration.

Figure 3:
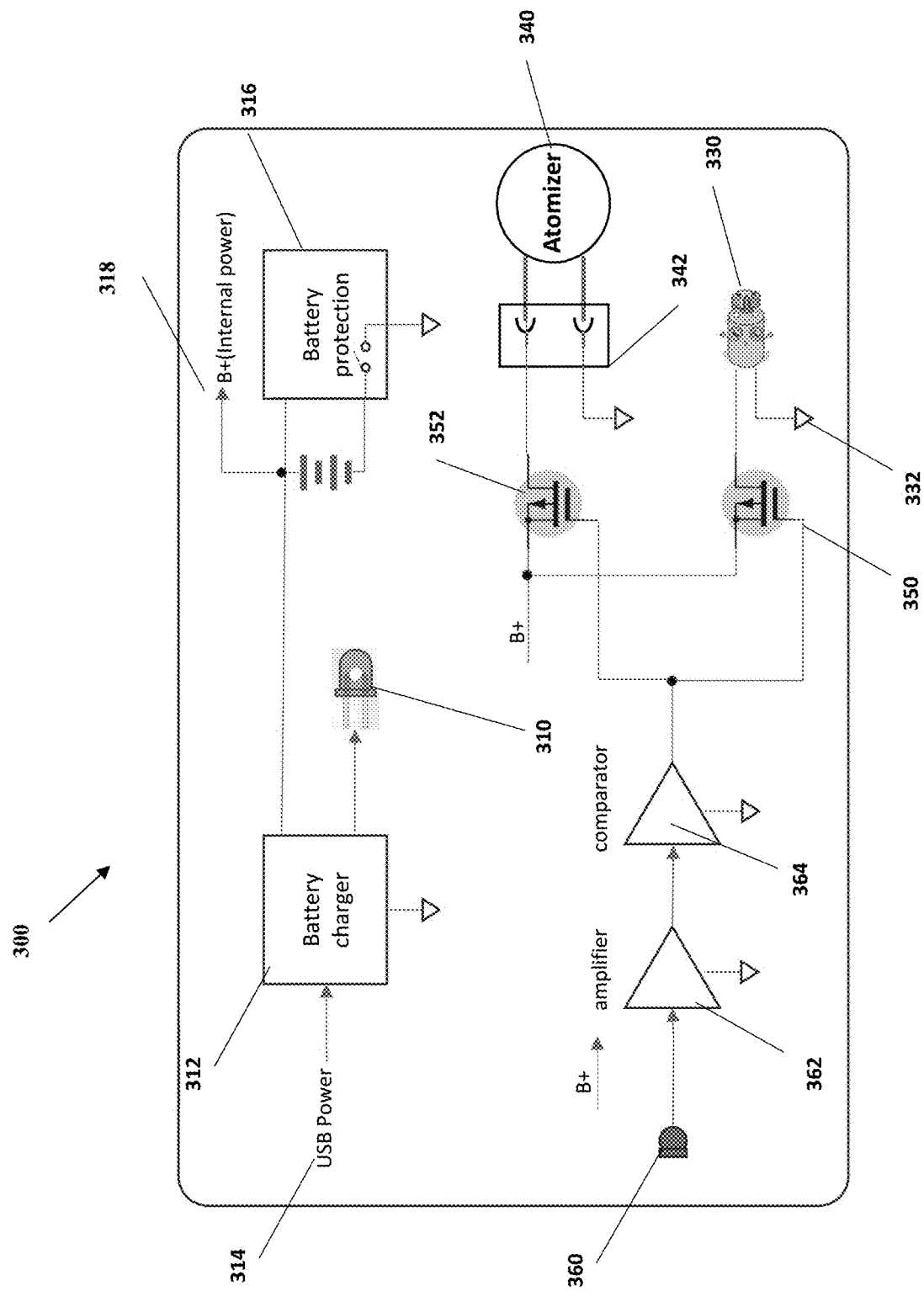
FIG. 3 is a schematic of the dispensing device including the Electromechanical Feedback Device circuit, according to one embodiment.

As shown in FIG. 3, the Electromechanical Feedback Device circuit 300 comprises a first LED light 310 operably coupled to a battery charger 312. The battery charger 312 is operably coupled to a USB power source 314 to show the charging status through the first LED light 310. The battery charger 312 is operably coupled to a battery protection device 316 and the internal power source or the battery 318, where the battery protection device 316 provides a safety level of the received samples, since the battery charger 312 and the battery protection 316 remain the same.

The Electromechanical Feedback Device circuit 300 includes an atomizer 340 and a motor or the Electromechanical Feedback Device 330 operably coupled to a MOSFET control 350, 352. The atomizer 340 is operably coupled to a first switch 342 and the motor 330 is operably coupled to a second switch 332. The atomizer 340 and motor 330 share an input control to the first switch 342 and the second switch 332, specially using the first MOSFET 350 and the second MOSFET 352. Air-flow sensor 360 is operably coupled to an amplifier 362 and a comparator 364 that is used for air-flow signal detection and control output to the input control. Once the air flow sensor 360 detects air flow, it sends a signal to the amplifier 362 and comparator 364 to operate the first MOSFET 350 and the second MOSFET 352 for the motor 330 and the atomizer 340, respectively. In one embodiment, a dual operational amplifier chip may be used.

All publications and patent applications mentioned in this specification are herein incorporated by reference to the same extent as if each individual publication or patent application was specifically and individually indicated to be incorporated by reference.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A Dispensing Device comprising:
   a. an external shell;
   b. an Electromechanical Feedback Device, a battery, a switch, and a power gateway disposed within the external shell, the electromechanical feedback device connected to the battery through the switch, wherein the switch accepts an input and in response to the input opens the power gateway allowing power to flow from the battery to the Electromechanical Feedback Device;
   c. a circuit including a battery charger operably coupled the switch; the circuit operably coupled to the first LED light, a second LED light, and a battery protection chip; the first LED light turns on when a power source is plugged into the battery charger; and the second LED light turns on when the battery charging is finished; and
   d. an atomizer and a direct current motor are operably controlled by the signal of an air-flow sensor; the direct current motor is directly driven by an Amplifier/Buffer; and the atomizer is powered through a MOSFET.

2. The dispensing device of claim 1, wherein the MOSFET is operably coupled to an RC timer and a logical circuit, wherein the RC timer includes a 10 second limit.

3. The dispensing device of claim 2, wherein the air-flow sensor operably coupled to the MOFSET, the air-flow sensor including a logical output and connected to the amplifier/buffer.

4. The dispensing device of claim 3, wherein the battery protection chip including an overcharging circuit, an over-discharging circuit, an overcurrent circuit, and a short circuit.

5. The dispensing device of claim 4, wherein the direct current motor is operably coupled to an operational amplifier set as a buffer.

6. The dispensing device of claim 5, further comprising a freewheeling diode operably coupled to the operational amplifier and a transistor.

7. The dispensing device of claim 6, wherein the direct current motor is a DC motor and when the transistor is turn on, a voltage applies on the DC motor and the DC motor starts to work; an NPN transistor works as a switch to provide a voltage drop to protect the DC motor by working under a rated voltage.

8. The dispensing device of claim 7, the air flow sensor includes an output digital signal including an output high level when sucking is applied to the external housing by a user, an output low level when not sucking, and a sucking strength that is not configurable.

9. A Dispensing Device comprising:
   a. an external shell;
   b. an Electromechanical Feedback Device disposed within the external shell, the electromechanical feedback device connected to a battery through a switch, wherein the switch accepts an input from operation of the dispensing device and in response to the input opens a power gateway allowing power to flow from the battery to the Electromechanical Feedback Device;
   c. an Electromechanical Feedback Device circuit including a first LED light operably coupled to a battery charger; the battery charger is operably coupled to a power source to show the charging status through the first LED light; the battery charger is operably coupled to a battery protection and the battery, where the battery protection provides a safety level, since the battery charger and the battery protection remain the same; and
   d. an atomizer and the Electromechanical Feedback Device is a motor, the motor operably coupled to a MOSFET control including a first MOFSET and a second MOFSET; the atomizer is operably coupled to a first switch and the motor is operably coupled to a second switch; the atomizer and the motor share an input control of the first MOSFET and the second MOSFET.

10. The dispensing device of claim 9, wherein the input control comprises an air-flow sensor operably coupled to an amplifier and a comparator that is used for air-flow signal detection and control output to the input control.

11. The dispensing device of claim 10, wherein the amplifier is a dual operational amplifier.

\* \* \* \* \*